United States Patent [19]
Derr et al.

[11] Patent Number: 6,068,119
[45] Date of Patent: May 30, 2000

[54] WATERTIGHT PROTECTIVE DEVICE FOR HOLDING A MEASURING OR DISPLAY DEVICE

[75] Inventors: Andreas Derr, Degernau; Patrick Zahn, Eisenbach, both of Germany

[73] Assignee: Testo GmbH & Co., Lenzkirch, Germany

[21] Appl. No.: 08/892,751

[22] Filed: Jul. 15, 1997

[30] Foreign Application Priority Data

Jul. 18, 1996 [DE]  Germany ............................ 296 12 454

[51] Int. Cl.$^7$ .................................................... B65D 85/00
[52] U.S. Cl. ............................ 206/305; 206/701; 206/776
[58] Field of Search .................................... 206/305, 320, 206/701, 722, 723, 776, 777, 778, 45.24

[56] References Cited

U.S. PATENT DOCUMENTS

| | | | |
|---|---|---|---|
| 4,836,256 | 6/1989 | Melicone ................................. | 206/305 |
| 5,092,459 | 3/1992 | Uljanic et al. ............................ | 206/320 |
| 5,119,239 | 4/1993 | Younger . | |
| 5,175,876 | 12/1992 | Mendoza ................................. | 206/320 |
| 5,499,713 | 3/1996 | Huffer ................................. | 206/320 X |
| 5,648,757 | 7/1997 | Vesnace et al. ...................... | 206/320 X |
| 5,713,466 | 2/1998 | Tajima .................................... | 206/320 |

FOREIGN PATENT DOCUMENTS

| | | |
|---|---|---|
| 0 419 755 A1 | 4/1991 | European Pat. Off. . |
| 90 01 055 U | 5/1990 | Germany . |
| 07288567 | 10/1985 | Japan . |
| 8-237344 | 9/1996 | Japan . |
| 2 296 314 | 6/1996 | United Kingdom . |

*Primary Examiner*—Jacob K. Ackun
*Attorney, Agent, or Firm*—Foley, Hoag & Eliot LLP

[57] ABSTRACT

A waterproof protective device for holding an apparatus having an interaction field is formed from a dimensionally stable protective housing having a lower housing part and an upper housing part. The lower housing part and the upper housing part are releasably hingedly connected with one another and an inside contour of the protective housing is adapted and constructed to closely receive the apparatus with approximately zero play. The protective housing is provided with a transparent, elastically flexible operating area of reduced wall thickness to enable an interaction field to be viewed and manipulated. The operating area may be integral with the rest of the protective housing and may be sufficiently elastically deformable so that pushbuttons on the apparatus may be operated by finger pressure through the protective device under the operating area. A seal is provided between the upper housing part and the lower housing part, and is formed of a mating circumferential groove and rim, one or both of which may be provided with lips. The watertight protective device may also include additional features such as recesses on a side facing away from operating area to enable the protective device to be fastened to a matching mount or a stand fastened by a hinge to the protective housing. At least one reinforcing strip may be provided on the protective housing and formed from the same material as the protective housing. A watertight plug aperture may be formed in the protective housing. To facilitate removal of the apparatus from the protective housing, an area of reduced wall thickness and adjacent pusher may be formed on an area opposite a removal opening, so that an user can partially push the apparatus out of the lower housing part.

18 Claims, 8 Drawing Sheets

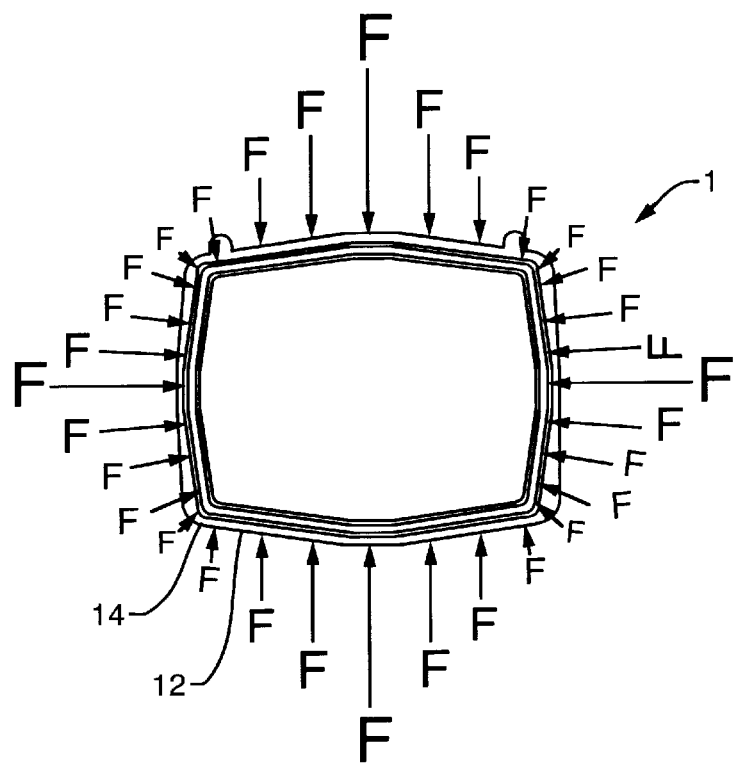
FIG. 3B
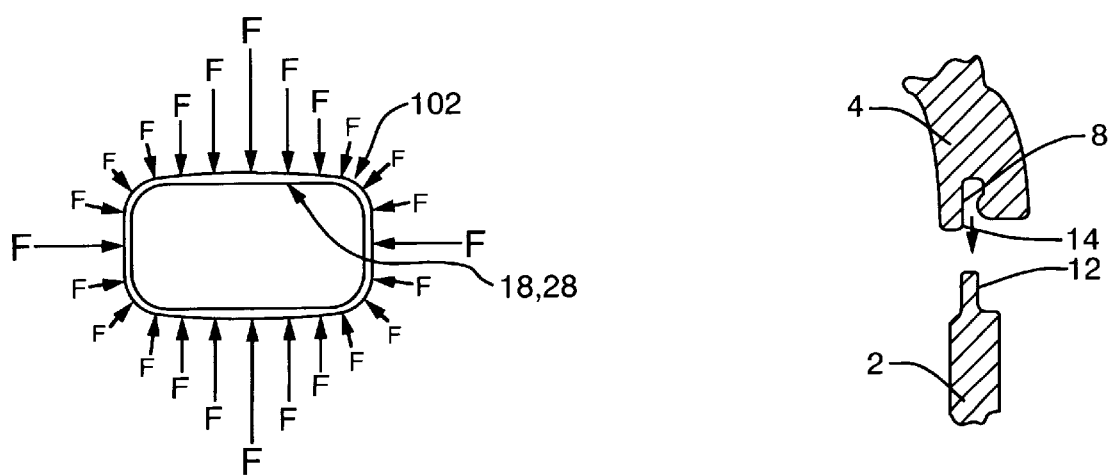
FIG. 3C
FIG. 3D

WATERTIGHT PROTECTIVE DEVICE FOR HOLDING A MEASURING OR DISPLAY DEVICE

BACKGROUND OF THE INVENTION

1. Field of the Invention

The invention relates to a watertight protective device for holding a measuring or display device, and more particular to a protective device having a protective housing, the inside contour of which is shaped so conform with an the outer dimensions of a contained measuring or display device.

2. Description of the Related Art

Protective devices serve to hold measuring or display devices in a water- and dust-tight fashion, with the operation of the device not being adversely affected by the protective device. Known protective devices consist of flexible transparent protective sheaths with a pouch design that can be sealed to make them water- and dust-tight. Operation of a measuring or display device placed in the protective sheath is retained because of the flexibility of the sheath. To guarantee flexibility, such protective sheaths are made of a relatively thin plastic material so that the lifetime of such sheaths is limited in the frequently harsh operating conditions to which measuring devices are subjected. Under extreme operating conditions, there is frequently the risk that the measuring or display device will be damaged by external application of force since the thin sheath cannot withstand such external forces.

Another disadvantage of known protective sheaths is that even minor damage to the protective sheath surface is sufficient for water tightness to be no longer guaranteed. In addition, the protective sheath may prevent the measuring device from measuring the provided amount, since the measuring device is wholly contained within the protective sheath.

SUMMARY OF THE INVENTION

Accordingly, it is an object of this invention to provide a protective device which is water-tight and dust-tight, and which will protect a contained display or measuring device against the external application of force.

To achieve this object, a protective device is provided having a protective housing made from a dimensionally stable material. The inside contour of the protective housing is shaped to conform with the outer dimensions of the display or measuring device so that there is essentially zero play between the protective device and the contained device. Additionally, the protective housing may have an operating area that is transparent and yields elastically to enable operation of the contained device.

By providing a protective device of this nature, the dimensionally unstable protective sheaths previously used may be replaced by a dimensionally stable housing in which, as the result of a suitable choice of materials, the operating and display elements of the inserted measuring or display device remain visible through the housing wall and can also be operated. The essentially zero-play accommodation of the measuring or display device offers optimum protection against external applications of force. The protective device so designed is largely insensitive to objects, especially those with sharp edges, that would have damaged the surface of conventional protective sheaths, since the wall thickness is much greater than the wall thickness of conventional protective sheaths. Thus, the lifetime of the protective device is increased.

In one embodiment, the inside contour of the protective device is shaped to conform with the contours of the measuring or display device it is designed to contain. By doing this, the outer dimensions of the protective device may be minimized while still performing the sealing and protecting functions.

To facilitate insertion and removal of the measuring or display device, it is preferable to form the housing from an upper part and a lower part which are releasably connected with each other. The connection of the lower housing part and the upper housing part can be formed from a circumferential groove mounted on either the upper or lower housing part and a circumferential rib formed on the other housing part. In operation, the rib engages the groove to join the upper housing part and the lower housing part. In this manner, a reliable seal may be formed between the two housing parts by using an elastically flexible material with a rib that is at least slightly larger than the groove. The sealing effect of the connection between the upper housing part and lower housing part can be additionally increased by providing sealing lips on the groove and/or rib.

Optionally, the upper housing part may be connected to the lower housing part by a hinge, for example a film hinge, which can prevent one of the two parts from being lost. Other types of hinges, such as pin hinges or living hinges may also be used.

To ensure complete operation of the measuring or display device placed in the protective device, an operating area may be provided on the protective device behind which the operating and/or display area of the measuring or display device is located. In one embodiment, the housing portion that serves as the operating area of the protective housing has a reduced wall thickness. In this manner, it is possible for an user to operate buttons on the measuring or display device, as long as the operating area is capable of sufficient elastic deformation by finger pressure. From a manufacturing standpoint, it is advantageous to form the operating area integral with the protective housing, and from the same material.

For example, transparent soft PVC can be used as the material for making the protective housing described above. When this material is used, a protective device can be obtained that is transparent not only in the operating area but everywhere. In addition, thermoplastic elastomers (TPE) or thermoplastic polyurethanes (TPU) can be used to make the protective housing.

Another embodiment provides for providing recesses, preferably on the side facing away from the operating area, that can serve to fasten the protective housing, including the measuring or display device accommodated therein, to a matching mount. In order to achieve greater resistance to twisting of the protective device and hence improved handling ability, at least one reinforcing strip may be provided. The reinforcing strip may be made of the same material as the protective housing or different material. The reinforcing strip offers greater protection for the measuring or display device located in the protective device against outside forces.

In order to connect a measuring or display device placed in the protective device with a measuring sensor or other peripheral device for example, an opening is provided in the protective device through which a plug can be guided in a watertight fashion and then connected with the measuring or display device.

The sealing effect in the vicinity of the opening can be ensured in an especially simple fashion by adapting the shape and size of the opening to the shape and size of the plug, so that the protective housing abuts the plug in the area of the opening over its entire surface and therefore forms a watertight seal. Optionally, a sealing lip may be located in the opening to provide a linear contact all the way around the plug that has been inserted or against the housing of the measuring or display device, thus producing a watertight seal. A lip of this nature is advantageous in that the plug can be inserted through the opening by the application of a low force.

A stand may be provided on the housing and connected to the housing by a hinge so that the hinge may be moved in and out (similar to a picture frame). In this manner, the stand may enable the measuring device, contained in the protective housing, to stand upright on a desk or other surface. Recesses may be provided on the housing and used to fasten the protective housing to a mount or to a rotatable stand.

An area of reduced wall thickness is preferably provided on the protective housing on a side that is opposite a removal opening. This area can be deformed by a user in order to shove the inserted measuring or display device toward the removal opening to remove it. The measuring and display device advantageously abuts the area of reduced wall thickness at a pusher.

BRIEF DESCRIPTION OF THE DRAWINGS

The preferred embodiments of the present invention will now be described more specifically with reference to the attached drawings, wherein:

FIGS. 2(*b*) and 2(*d*) are enlarged cross-sectional views of the encircled portions of FIGS. 2(*a*) and 2(*c*) respectively;

FIGS. 3(*b*) and 3(*c*) are cross-sectional views taken along lines X—X and Y—Y of FIG. 3(*a*) respectively;

FIG. 3(*d*) is an expanded, cross-sectional view of the watertight seal encircled in FIG. 3(*a*);

DETAILED DESCRIPTION

Figure 1:
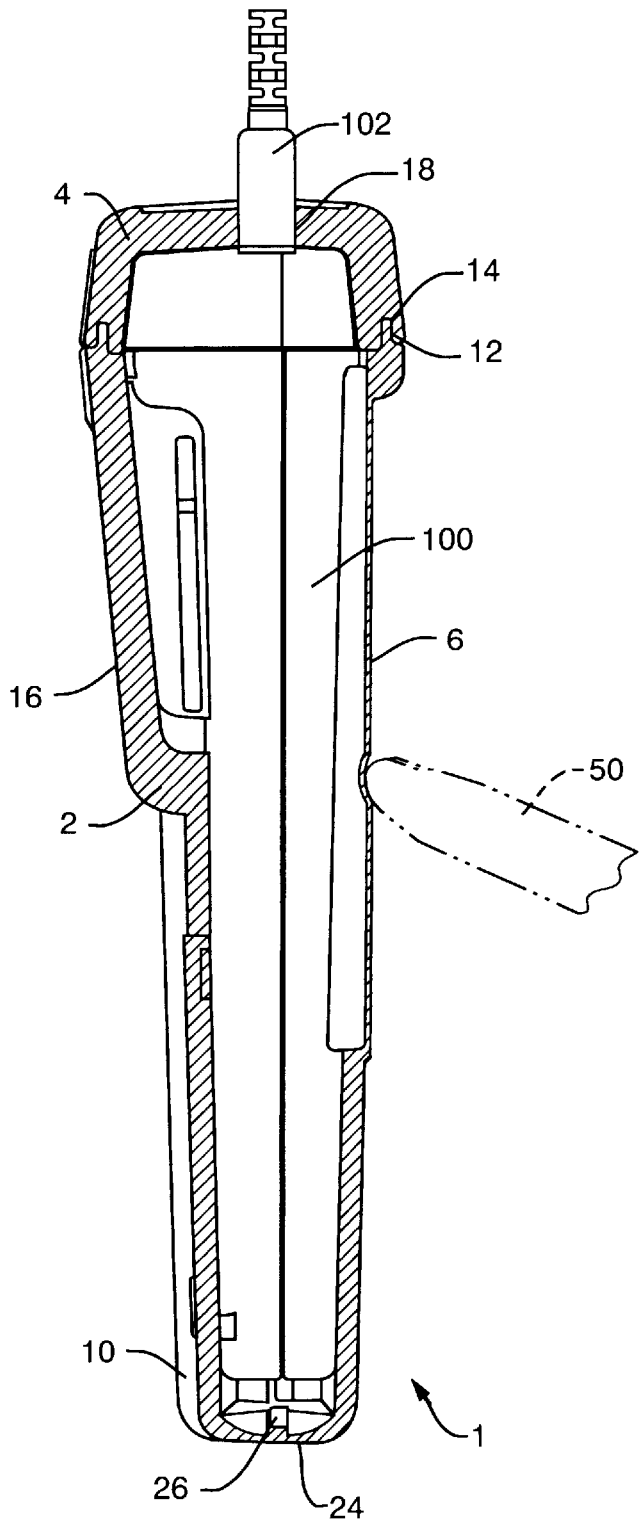
FIG. 1 is a cross-sectional view of one embodiment of a protective device according to this invention containing a measuring or display device.
Figure 2A:
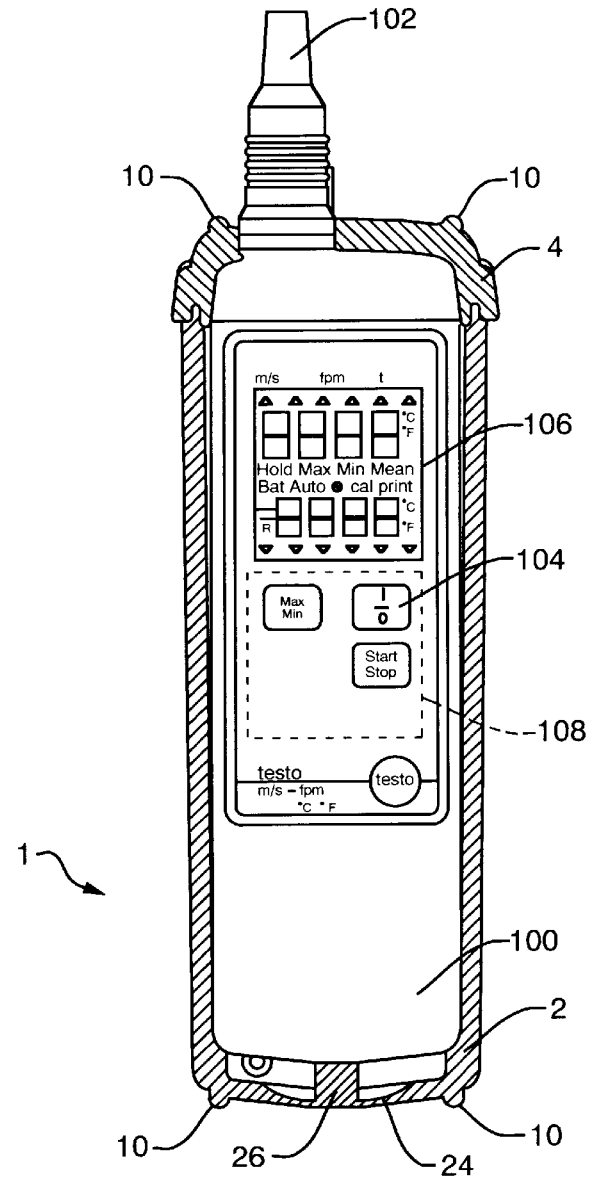
FIGS. 2(*a*) and 2(*c*) are cross-sectional views of protective devices according to this invention.
Figure 2B:
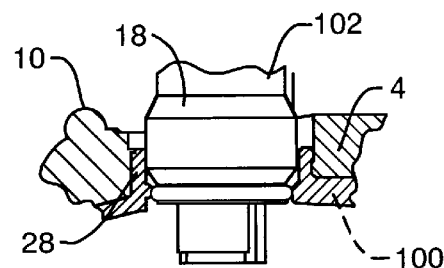
Figure 2C:
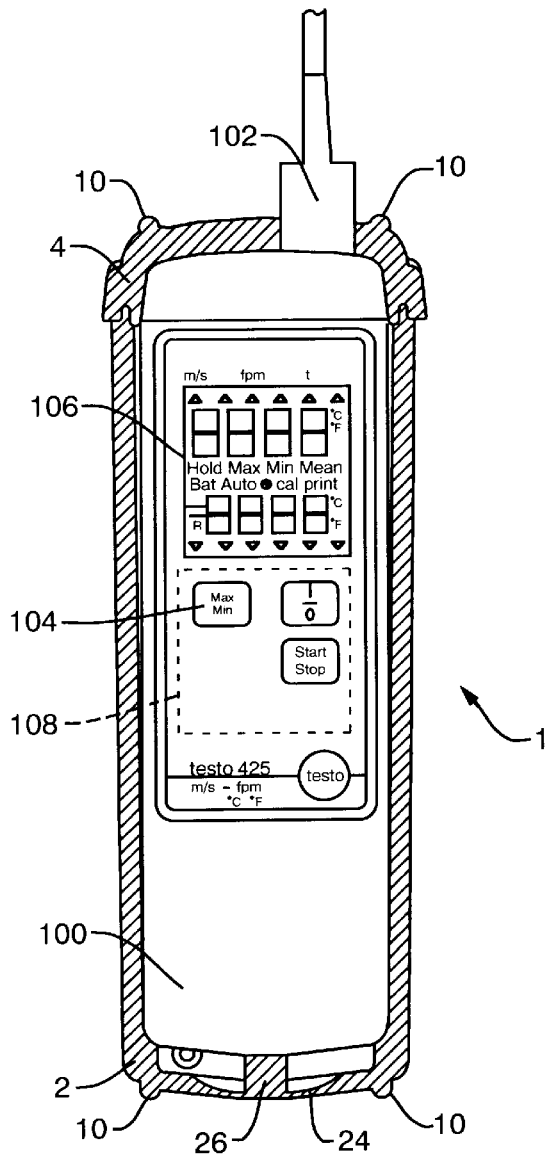
Figure 2D:
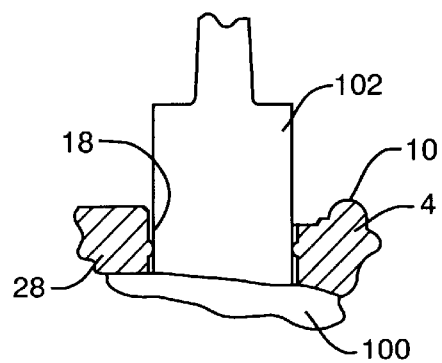
Figure 3A:
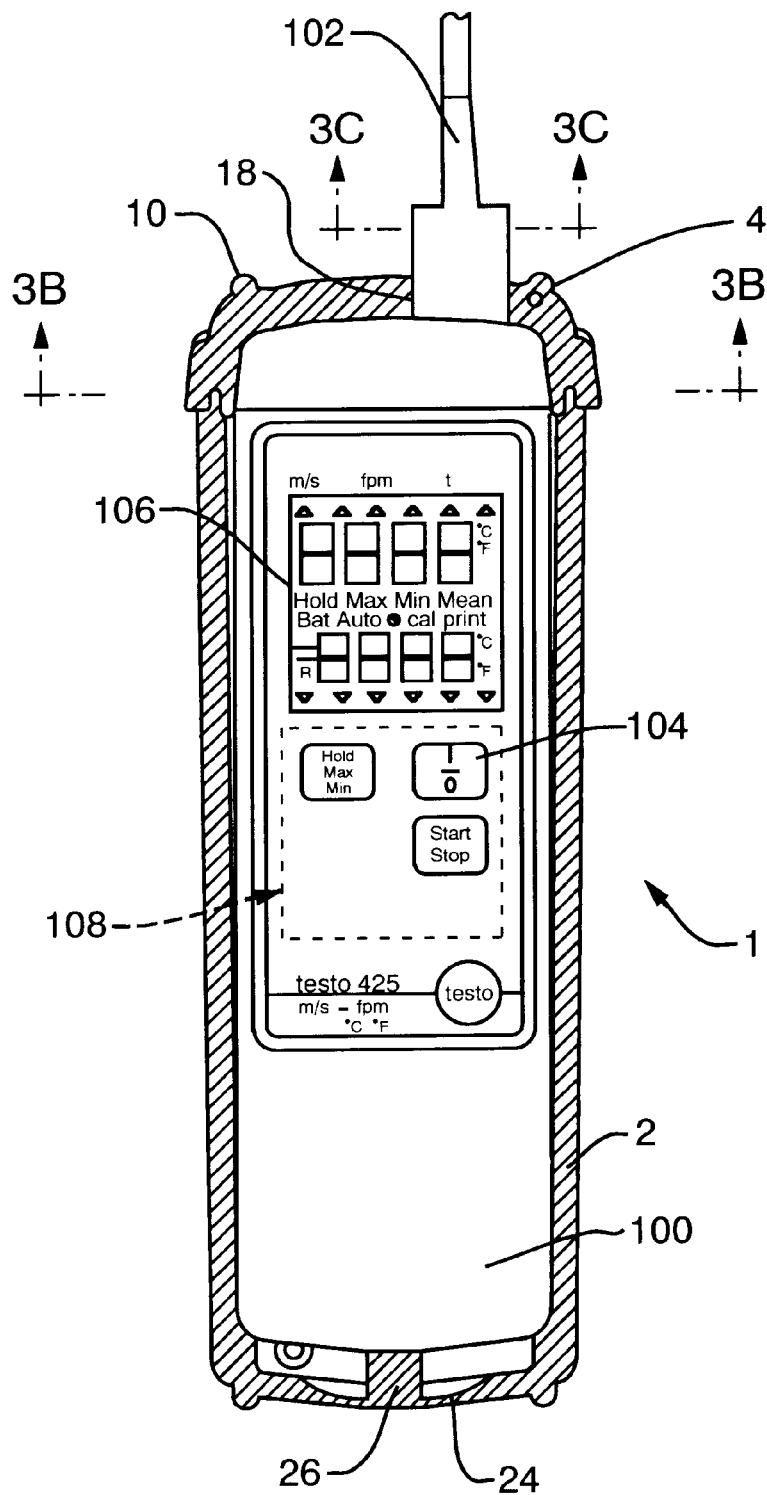
FIG. 3(*a*) is a cross-sectional view of a protective device according to this invention.

As shown in FIGS. 1 to 3(*d*) the protective device according to this invention may include a protective housing 1 that has a lower housing part 2 and an upper housing part 4.

The protective housing 1 has an operating area 6 behind which an operating field 108 and a display field 106 of an inserted measuring or display device 100, not shown in cross section, are located. Operating area 6 is formed at a location in the protective housing corresponding to a display field 106 and formed to be elastically deformable under ordinary pressure from a finger 50. One way of forming the protective housing to be elastically deformable is to provide a reduced wall thickness in this area. Alternative ways of rendering this portion elastically deformable may include altering the chemical composition of the material in this portion of the device, such as by adding solvent, or by using a different material to form this portion of the protective housing. By providing an elastically deformable operating area 6, it becomes possible to operate a pushbutton 104 located on the device 100 through the protective housing 1.

As shown in FIG. 3*d*, the lower housing part 2 has a circumferential rib 12 that engages a circumferential groove 14 in the upper housing part 4 when the lower housing part 2 is connected to the upper housing part 4. A sealing lip 8 located in the circumferential groove 14 guarantees the watertightness of the protective housing in the corresponding areas.

A plug 102 from the measuring or display device 100 is brought out through an opening 18 in upper housing part 4. A circumferential sealing lip in the vicinity of the plug opening 18 guarantees a watertight feedthrough of plug 102 through the protective housing 1. Depending on the design of the measuring or display device 100, a sealing lip 28 abuts the measuring or display device 100 in a watertight fashion, or does so with respect to plug 102, as shown by FIGS. 2(*b*) and 2(*d*). In the embodiment shown in FIG. 2(*b*), the housing of the measuring or display device 100 abuts the plug 102 in a watertight fashion.

FIG. 3(*b*) illustrates a cross-sectional view of the protective housing 1 along a section line X—X in FIG. 3(*a*) to better show the relationship between the groove 14 of the upper housing part 4 and the sealing rib 12 of the lower housing part 2 in a top view. FIG. 3(*b*) also shows the sealing forces F that results between the groove 14 and the rib 12 of the lower housing part 2. The upper housing part 4, groove 14 and rib 12 are designed so that the sealing forces F in each case are the greatest at the middles of the four sides, and taper off toward the corners. The lengths of the force arrows symbolize the sealing forces F produced by the groove 14 and rib 12 in a quantitative manner.

FIG. 3(*c*) is an enlarged cross-sectional view taken along line Y—Y in FIG. 3(*a*) and clearly shows the contours of plug 102, which in this embodiment is made approximately rectangular, and also shows the contours of the opening 18 of the upper housing part 4. The contour of the opening 18 may be formed by sealing lip 28. The dimensions of the plug 102 are slightly larger than the dimensions of the plug opening 18, so that when the plug 102 is inserted into the measuring or display device 100, the upper housing part 4 abuts the plug 102 in a watertight fashion in the vicinity of the plug opening 18. As indicated by FIG. 3(*c*), the greater size of plug 102 with respect to the opening 18 or sealing lip 28 is at a maximum in the middle of each of the four sides of the rectangular plug 102 and decreases toward the corners. This ensures that the sealing forces are greatest at the middle of each of the sides and decrease toward the corners.

As shown especially in FIGS. 1, 2(*a*), 2(*c*) and 3(*a*), the lower housing part 2 has an area 24 of reduced wall thickness adjacent a pusher 26 designed as a projection on a side that is opposite a removal opening. The measuring and display device 100 inserted in the lower housing part abuts the pusher 26. The area 24 is designed so that it is deformable by an user by the application of external force to push the measuring or display device a short distance out of the lower housing part 2 when the upper housing part 4 has been removed. This facilitates removal of the measuring or display device 100 from the protective housing 1.

Figure 6:
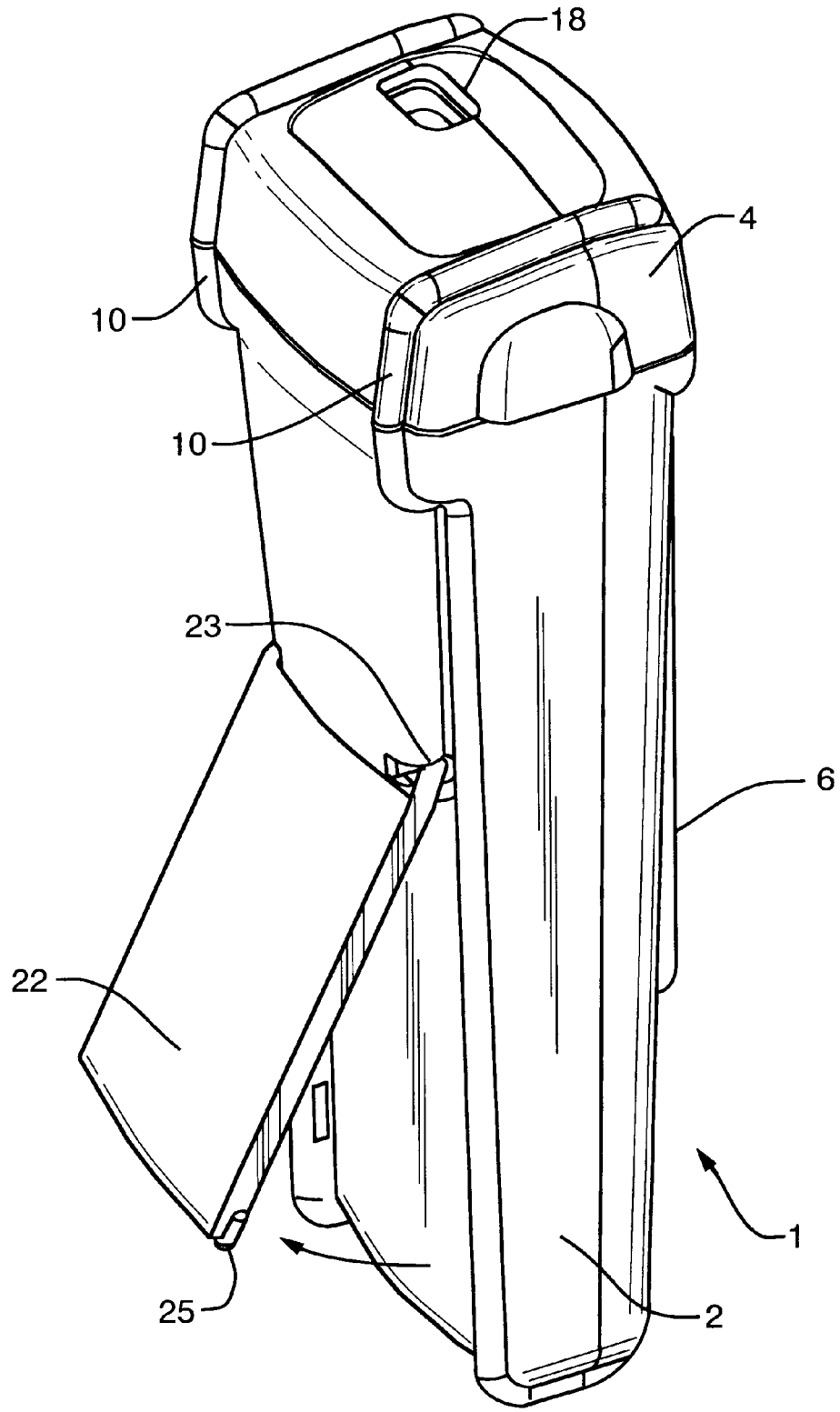
FIG. 6 is a perspective view of a protective housing with the stand deployed. In these figures, unless stated to the contrary, the same reference numerals are used to mark the same parts and have the same meanings.

FIG. 6 is a perspective view of an embodiment of a protective housing according to the invention that has a stand 22 on the side of the protective housing opposite the operating area 6. The stand may be configured to be capable of being folded in or out by means of a hinge 23. In the unfolded state, the stand 22 allows the protective housing 1 to stand on a surface, with operating area 6 in the deployed state preferably being tilted at an angle with respect to the surface to facilitate operation of the measuring or display device 100. Preferably, the stand 22 has rubber projections 25 or similar devices at its lower end to generate friction between the stand 22 and the surface.

Figure 4:
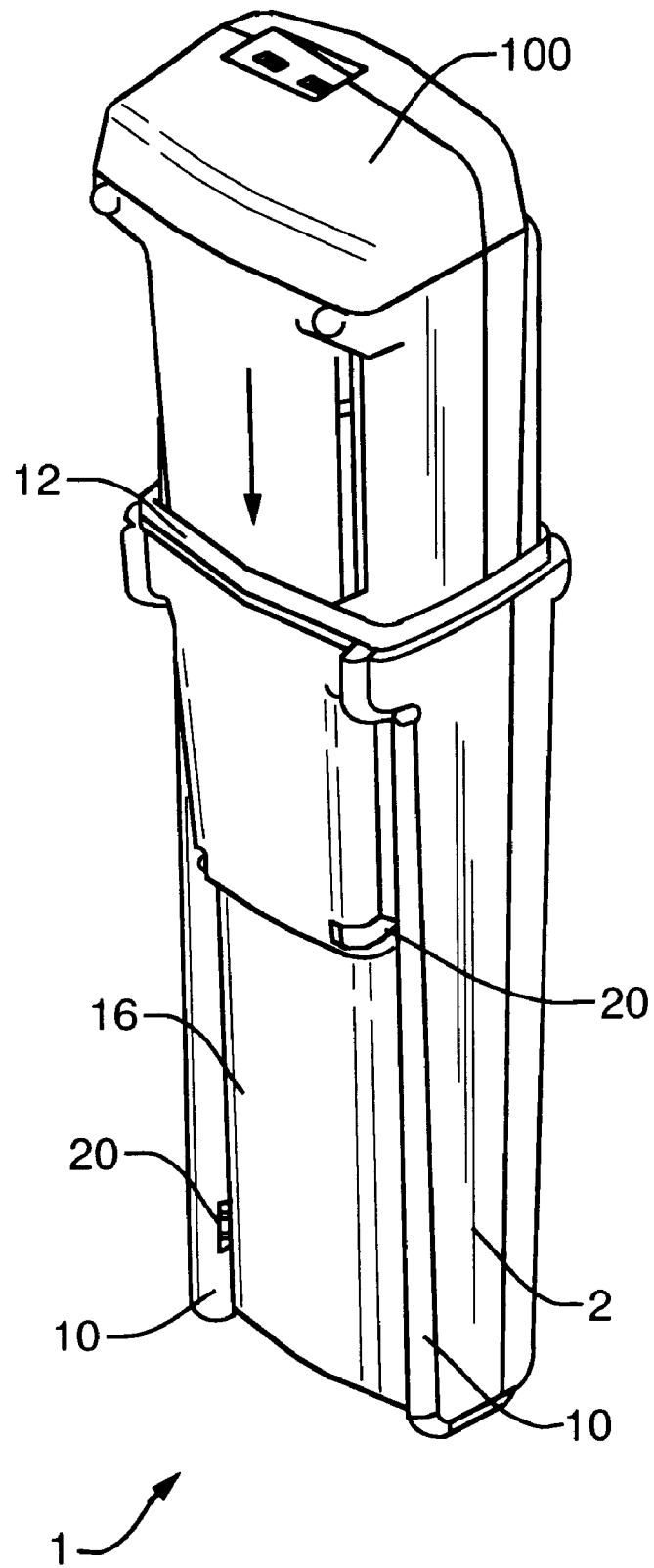
FIG. 4 is a perspective view of a lower housing part into which a measuring or display device has been partially inserted.
Figure 5:
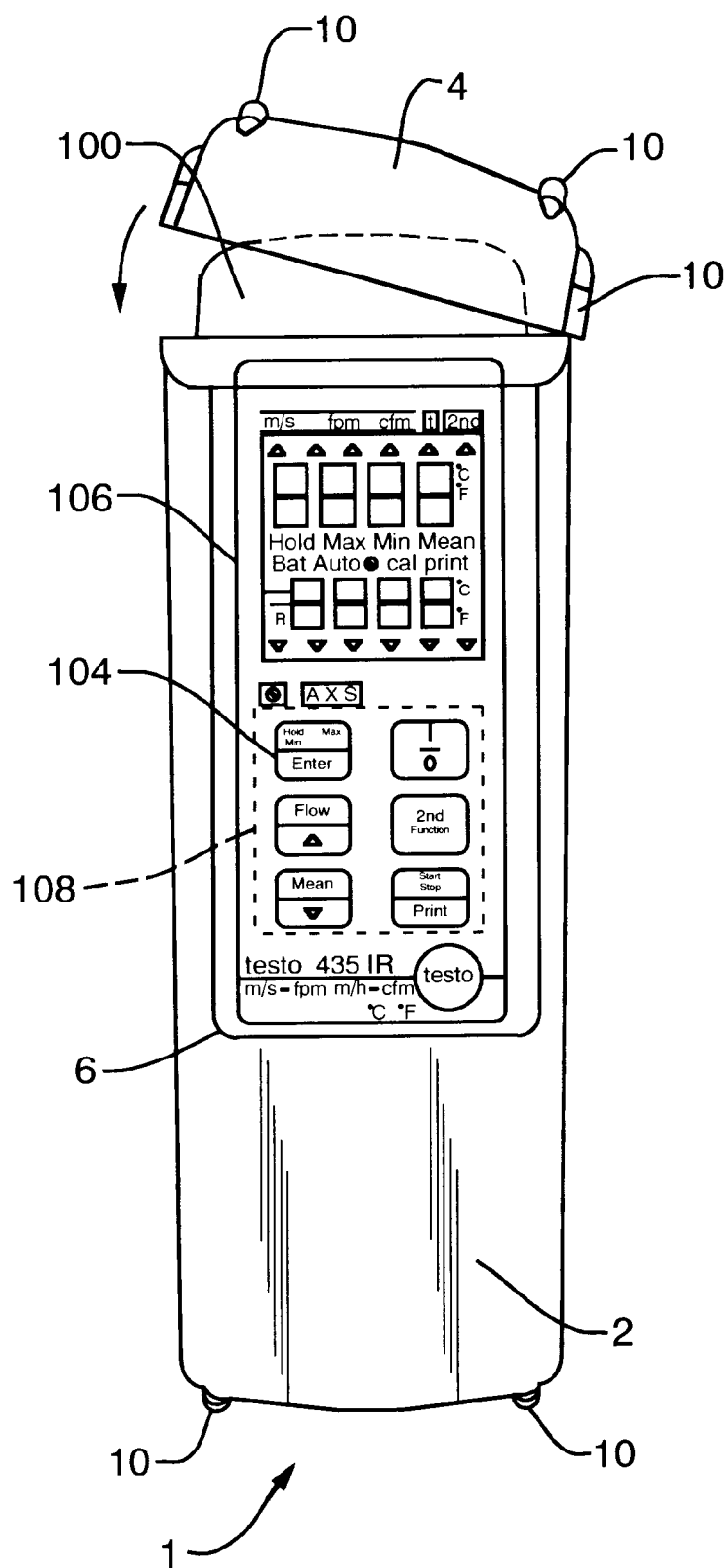
FIG. 5 is a front view of a protective device according to the invention with the measuring or display device inserted, with a upper housing part not being pushed completely onto a lower housing part as shown.

As is particularly clear from FIGS. 4 to 6, reinforcing strips 10 are located on the protective housing. These strips increase the resistance of the protective housing to twisting and also serve to protect the measuring or display device 100 located inside the protective housing against the application of external forces. As is also evidence from FIG. 4, recesses 20 may be provided on the side 16 facing away from the operating area 6 to fasten the protective housing 1 to a mount (not shown). Preferably, two of the recesses 20 may also be used to attach the protective housing to a stand 22.

It should be pointed out that upper housing part 4 and lower housing part 2 do not necessarily need to have the shape and size shown in the figures. Rather, any parts may be used as upper housing part 4 and lower housing part 2 that produce a similar protective housing 1 when assembled. For example, protective housing 1 can be divided to form two shell halves which mate to contain the measuring or display device 100.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

This application claims priority from German Patent Application No. 296 12 454.0, the content of which is hereby incorporated by reference.

We claim:

1. A watertight protective device for receiving an apparatus having an interaction field, comprising:
a protective housing, having an inside contour that receives the apparatus and having a transparent, elastically flexible operating area enabling one of viewing and interaction with said interaction field, said protective housing further including an upper housing part and a lower housing part, said upper and lower housing parts being sealingly engagable and releasable connected with each other,
wherein the lower housinig part and the upper housing part are each provided with one of a circumferential groove and a circumferential rib aud sealing lips disposed on one of said groove and said lip, in such a fashion that when the upper housing part is placed on top of the lower housing part, the rib engages the groove to form a watertight seal.

2. The watertight protective device according to claim 1, wherein the interaction field is one of a display field and an operating field.

3. The watertight protective device according to claim 1, wherein the protective housing is formed from a dimensionally stable material.

4. The watertight protective device according to claim 1, further comprising a hinge connecting said upper housing part and said lower housing part.

5. The watertight protective device according to claim 1, wherein the elastically flexible operating area is formed from a housing section having a reduced wall thickness.

6. The watertight protective device according to claim 1, wherein the operating area is made sufficiently elastically deformable so that pushbuttons on the apparatus under the operating area may be operated by finger pressure through the protective device.

7. The watertight protective device according to claim 6, wherein the operating area is formed integral with the rest of the protective housing and is formed from the same material as the rest of the housing.

8. The watertight protective device according to claim 1, wherein the protective housing is transparent.

9. The watertight protective device according to claim 1, further comprising recesses on a side facing away from operating area to facilitate fastening of the protective device to a matching mount.

10. The watertight protective device according to claim 1, further comprising a stand on a side facing away from the operating area, said stand being fastened by a hinge to the protective housing.

11. The watertight protective device according to claim 1, further comprising at least one reinforcing strip provided on the protective housing, said reinforcing strip being made of the same material as the protective housing.

12. The watertight protective device according to claim 1, further comprising a plug opening formed in the protective housing through which a plug can be guided in a watertight fashion to be connected with the apparatus.

13. The watertight protective device according to claim 12, wherein a shape and size of the plug opening are adapted to a shape and size of the plug so that the plug abuts the protective housing in a watertight fashion in the vicinity of the plug opening.

14. The watertight protective device according to claim 12, further comprising a sealing lip located in the plug opening, said lip being constructed and adapted to abut one of a plug passing there through and said apparatus in a watertight fashion.

15. The watertight protective device according to claim 1, further comprising an area of reduced wall thickness on an area opposite a removal opening, said area being elastically deformable in order to be able to push the apparatus out of lower housing part to facilitate removal of the apparatus.

16. The watertight protective device according to claim 15, further comprising a pusher adjacent the area of reduced wall thickness.

17. A watertight protective device for holding an apparatus having an interaction field, comprising:
a protective housing formed from a dimensionally stable material formed of a lower housing part and an upper housing part, said lower housing part and said upper housing part being releasably connected with one another, an inside contour of said protective housing being adapted and constructed to closely receive said apparatus with approximately zero play, said protective housing having a transparent, elastically flexible operating area of reduced wall thickness enabling one of viewing and interaction with said interaction field, said operating area being integral with the rest of the protective lousing and sufficiently elastically deformable so that pushbuttons on the apparatus may be operated by finger pressure through the protective device under the operating area; and a seal being provided between said upper housing part and said lower housing part, said seal comprising a circumferential groove on one of said upper housing part and said lower housing part, and a mating circumferential rib formed on the other of the upper housing part and the lower housing part, sealing lips being fonned on one of said groove and rib, such that said rib and groove join to form a watertight seal when mated.

18. The watertight protective device according to claim 17, further comprising:

recesses on a side facing away from operating area for fastening the protective device to a matching mount;

a stand fastened by a hinge to the protective housing;

at least one reinforcing strip provided on the protective housing, said reinforcing strip being made of the same material as the protective housing;

a plug aperture formed in the protective housing through which a plug can be guided in a watertight fashion to be connected with apparatus, a shape and size of the plug opening being adapted to a shape and size of the plug so that the plug abuts the protective housing in a watertight fashion in the vicinity of the plug opening;

a sealing lip located in the plug opening, said lip being constructed and adapted to abut one of a plug passing there through and said apparatus in a watertight fashion;

an area of reduced wall thickness on an area opposite a removal opening, said area being elastically deformable in order to be able to push the apparatus out of lower housing part to facilitate removal of the apparatus; and a pusher adjacent the area of reduced wall thickness.

* * * * *